United States Patent
Deulgaonkar et al.

(10) Patent No.: US 9,819,732 B2
(45) Date of Patent: Nov. 14, 2017

(54) METHODS FOR CENTRALIZED MANAGEMENT API SERVICE ACROSS DISPARATE STORAGE PLATFORMS AND DEVICES THEREOF

(71) Applicant: NetApp, Inc., Sunnyvale, CA (US)

(72) Inventors: Ameet Deulgaonkar, Bangalore (IN); Swaminathan Ramany, Cupertino, CA (US); Subhabrata Sen, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 305 days.

(21) Appl. No.: 14/814,877

(22) Filed: Jul. 31, 2015

(65) Prior Publication Data
US 2017/0034258 A1 Feb. 2, 2017

(51) Int. Cl.
| | | |
|---|---|---|
| *G06F 15/16* | (2006.01) | |
| *H04L 29/08* | (2006.01) | |
| *G06F 3/06* | (2006.01) | |
| *G06F 9/00* | (2006.01) | |
| *H04L 12/24* | (2006.01) | |
| *H04L 29/14* | (2006.01) | |

(52) U.S. Cl.
CPC ............ *H04L 67/1002* (2013.01); *G06F 3/06* (2013.01); *G06F 9/00* (2013.01); *H04L 41/00* (2013.01); *H04L 67/1097* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 7,870,300 B2 * | 1/2011 | Helman | G06F 3/0604 710/5 |
| 8,429,097 B1 | 4/2013 | Sivasubramanian et al. | |
| 2004/0233910 A1 * | 11/2004 | Chen | H04L 67/1097 370/395.5 |
| 2006/0004820 A1 | 1/2006 | Claudatos et al. | |
| 2006/0004868 A1 | 1/2006 | Claudatos et al. | |
| 2008/0201417 A1 * | 8/2008 | McCain | G06F 9/44536 709/203 |
| 2009/0216778 A1 * | 8/2009 | Szyperski | G06F 9/541 |

(Continued)

OTHER PUBLICATIONS

Non-Final Office Action on co-pending U.S. Appl. No. 14/881,427 dated Jul. 14, 2017.

(Continued)

*Primary Examiner* — Joshua Joo
(74) *Attorney, Agent, or Firm* — Klein, O'Neill & Singh, LLP

(57) ABSTRACT

A method, non-transitory computer readable medium, and device that manages API requests includes receiving an API request to obtain a list of storage volumes from one or more storage devices, wherein the received API request is non-compatible with the API server computing device or the one or more storage devices. The received API request is scanned to identify a service type associated with the received request. Next, one or more service instances associated with the identified service type are identified. The list of storage volumes from the one or more storage devices using information from at least one service instance of the identified one or more service instances without converting the received API request is provided.

12 Claims, 6 Drawing Sheets

(56) References Cited

U.S. PATENT DOCUMENTS

2010/0250748 A1     9/2010  Sivasubramanian et al.
2016/0162189 A1*    6/2016  Malwankar ........... G06F 3/0611
                                                         711/170

OTHER PUBLICATIONS

Non-Final Office Action on co-pending U.S. Appl. No. 14/868,716 dated Aug. 28, 2017.
Notice of Allowance on co-pending U.S. Appl. No. 14/881,427 dated Sep. 13, 2017.

* cited by examiner

```
RequestHandler::handle(http_request)
{
    // find what service needs to be invoked
    // the type service needs to be invoked will
    // depend on the HTTP method in the request
    // and the URI string uri = getURI(http_request);
    string mehtod = getHTTPMethod(http_request);

serviceIntance = getServiceInstance(uri, method);
    serviceIntance.invoke(http_request);
}
```

FIG. 4

```
ServiceInstance::invoke (http_request) {

// find the storage platform for which this request was made
    // each storage platform has a unique HTTP URI prefix.

platform_type = getPlatformType (http_request);

// get the adaptor that handles the platform.

adaptor = geAdaptor(platform_type);

// each HTTP method GET/PUT/POST/DELETE is mapped to a service
    // on adaptor
    // call the appropriate service.

service = adator.getInventoryService();

// now call the service.

service.invoke(http_request);
}
```

FIG. 5

```
ServiceInstance::invoke (http_request) {

AdatorServiceInstance::invoke(http_request) {

// connect to the remote storage device
    // or management service using propritory
                    // API.

connection = connect(remote_device);

// execute the propritory API calls to handle
                // the HTTP request.

results make_api_calls (connection);

// convert the data from proprietory
    // response to stardard response.

return convert_result (results);
}
```

FIG. 6

METHODS FOR CENTRALIZED MANAGEMENT API SERVICE ACROSS DISPARATE STORAGE PLATFORMS AND DEVICES THEREOF

FIELD

This technology generally relates to management of storage devices and, more particularly, methods for managing API requests and devices thereof.

BACKGROUND

Application programming interfaces (API's) allow consumers or providers to interact with a service. As API's evolve, it may be desirable to release features to certain subsets of customers or providers to consume the services. By way of example, each tool that is released includes its own set of API's that can be consumed by the customer or providers. When the customers or providers try to integrate a tool that they developed with the tool released by an organization, they are forced to use the set of API's released for the tool by the organization because vendors offering storage services have disparate API set to manage their storage platforms and management services portfolio.

Unfortunately with prior technologies, the platform by the customer or provider may have their own set of API's. Accordingly, while integrating a service including a first set of API's with their platform that has a different set of API's, existing technologies require converting the API's from one form to another. This conversion in turn results in using a lot of time and resources. Additionally, due to this conversion, the consumers or providers are unable to fully integrate with a service with one set of API's with a platform with a different set of API's. Therefore, it is clear that prior technologies lacks a centralized programmable platform that can be used to integrate a tool with one set of API's with a platform with a different set of API's.

SUMMARY

A method for managing API requests includes receiving, by an API server computing device, an API request to obtain a list of storage volumes from one or more storage devices, wherein the received API request is non-compatible with the API server computing device or the one or more storage devices. The received API request is scanned by the API server computing device to identify a service type associated with the received request. Next, one or more service instances associated with the identified service type are identified by the API server computing device. The list of storage volumes from the one or more storage devices using information from at least one service instance of the identified one or more service instances without converting the received API request is provided by the API server computing device.

A non-transitory computer readable medium having stored thereon instructions for managing API requests comprising executable code which when executed by a processor, causes the processor to perform steps includes receiving an API request to obtain a list of storage volumes from one or more storage devices, wherein the received API request is non-compatible with the API server computing device or the one or more storage devices. The received API request is scanned to identify a service type associated with the received request. Next, one or more service instances associated with the identified service type are identified. The list of storage volumes from the one or more storage devices using information from at least one service instance of the identified one or more service instances without converting the received API request is provided.

An API server computing device includes a processor and a memory coupled to the processor which is configured to be capable of executing programmed instructions comprising and stored in the memory to receive an API request to obtain a list of storage volumes from one or more storage devices, wherein the received API request is non-compatible with the API server computing device or the one or more storage devices. The received API request is scanned to identify a service type associated with the received request. Next, one or more service instances associated with the identified service type are identified. The list of storage volumes from the one or more storage devices using information from at least one service instance of the identified one or more service instances without converting the received API request is provided.

This technology provides a number of advantages including providing methods, non-transitory computer readable medium and devices for more effectively managing API requests. Additionally, this technology is able to provide a centralized programmable platform that avoids the requirement of converting API's from one format to another. Further, this technology supports integration of multiple tools and platforms without any restriction by processing the received API request in the format supported by the client devices. As a result, consumers or providers of the API's services have a consolidated management plane to monitor and control the different storage devices. Similar to API's for monitoring and managing storage devices, the technology disclosed herein is also able to support device specific API's. Furthermore, by having a centralized a centralized programmable platform that avoids the requirement of converting API's from one format to another, users can achieve scalability and provides provisions to change implementations without any client disruptions.

BRIEF DESCRIPTION OF THE DRAWINGS

FIG. 4 is an exemplary illustration of the API server computing device receiving and managing the REST API request received via a REST API interface;

FIG. 5 is an exemplary illustration of a service instance stored within a memory of the API server computing device; and FIG. 6 is an exemplary illustration of an adapter identified from service configuration or parameters.

DETAILED DESCRIPTION

Figure 1:
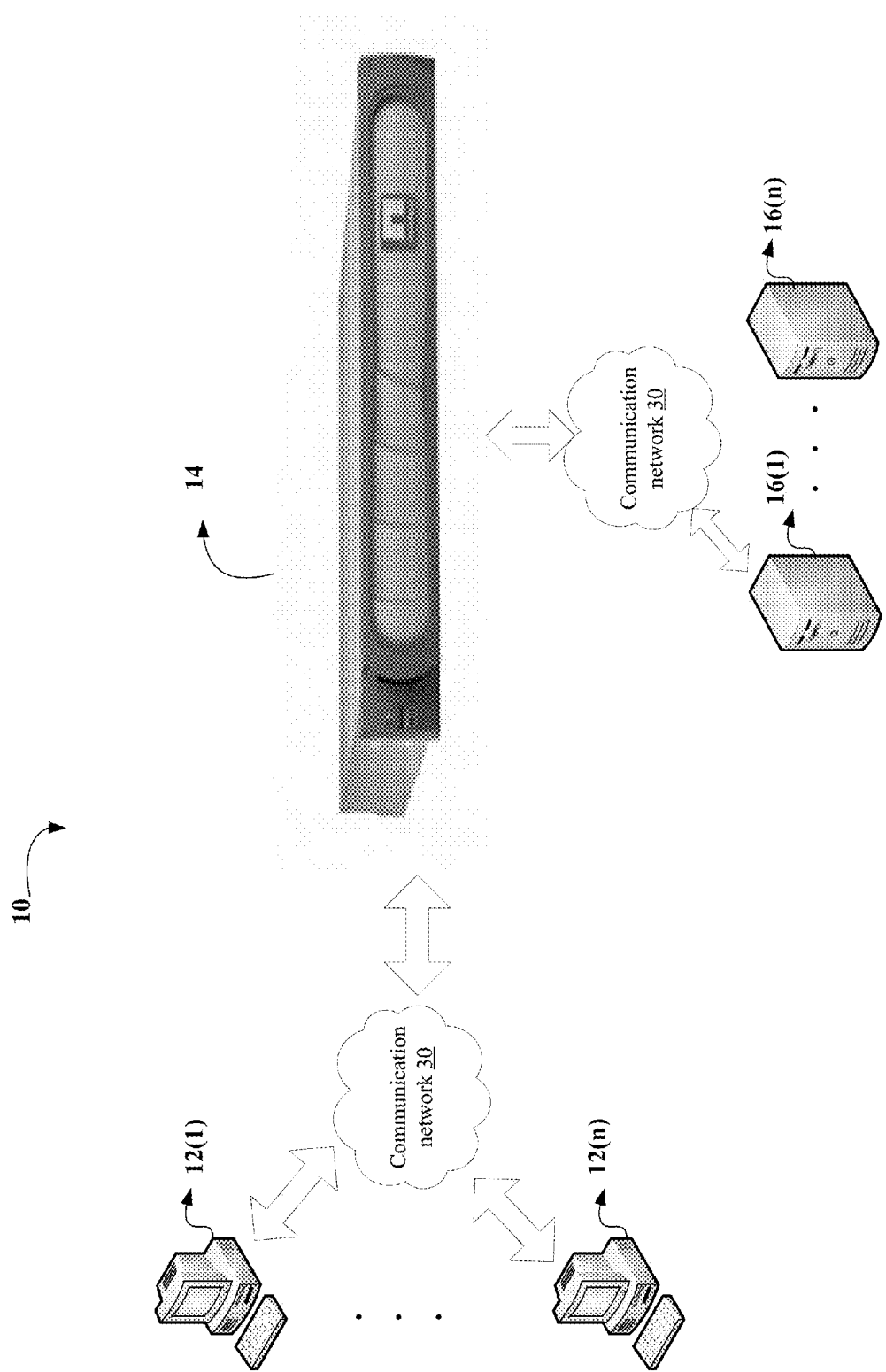
FIG. 1 is a block diagram of an environment with an exemplary API server computing device.

An environment 10 with a plurality of client computing devices 12(1)-12(n), an exemplary API server computing device 14 and a plurality of storage devices 16(1)-16(n) is illustrated in FIG. 1. In this particular example, the environment 10 includes the plurality of client computing devices 12(1)-12(n), the API server computing device 14 and the plurality of storage devices 16(1)-16(n) coupled via one or more communication networks 30, although the environment could include other types and numbers of systems, devices, components, and/or other elements. In this example, the method for managing API requests performed by the API server computing device 14 although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable medium and devices for effectively managing API requests.

Figure 2:
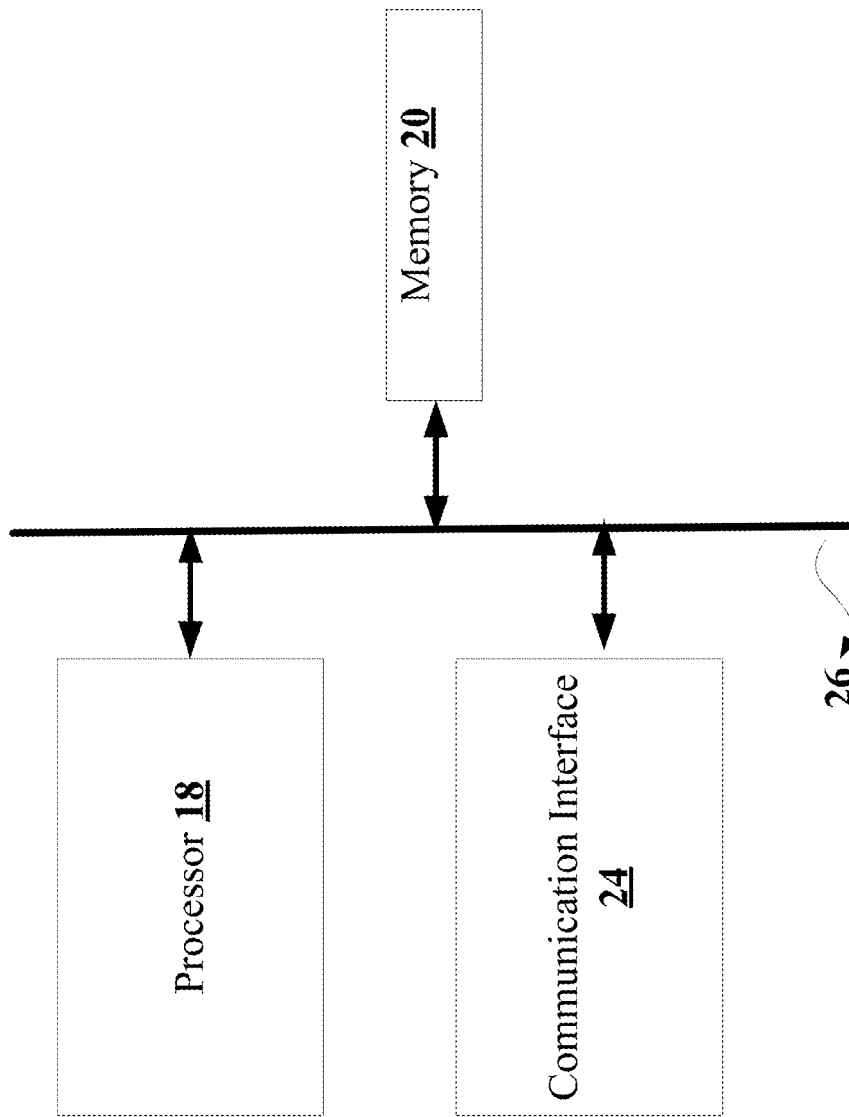
FIG. 2 is a block diagram of the exemplary API server computing device shown in FIG. 1.
Figure 3:
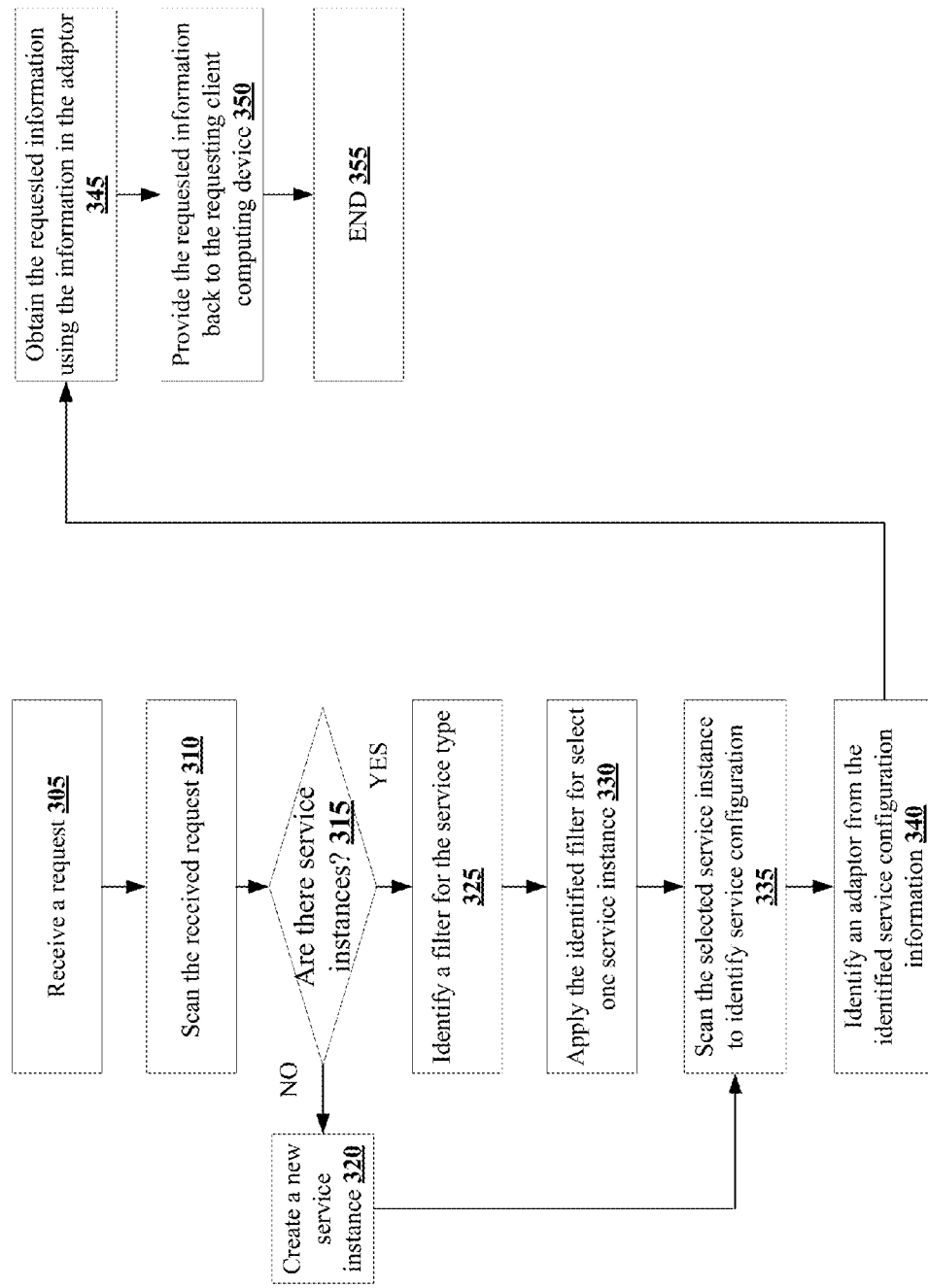
FIG. 3 is a flow chart of an example of a method for managing API requests.

Referring more specifically to FIG. 2, in this example the API server computing device 14 includes a processor 18, a memory 20, and a communication interface 24 which are coupled together by a bus 26, although the API server computing device 14 may include other types and numbers of elements in other configurations.

The processor 18 of the API server computing device 14 may execute one or more programmed instructions stored in the memory 20 for managing API requests as illustrated and described in the examples herein, although other types and numbers of functions and/or other operation can be performed. The processor 18 of the API server computing device 14 may include one or more central processing units ("CPUs") or general purpose processors with one or more processing cores, such as AMD® processor(s), although other types of processor(s) could be used (e.g., Intel®).

The memory 20 of the API server computing device 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the API server computing device 14 operatively couples and communicates with the plurality of client computing devices 12(1)-12(n) and the plurality of storage devices 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, an interface device, and an I/O system, which are coupled together by a bus or other link, although other numbers and types of network devices could be used. The plurality of client computing devices 12(1)-12(n) communicates with the API server computing device 14 for requesting access to data or files in the plurality of storage devices 16(1)-16(n) or to manage the plurality of storage devices 16(1)-16(n), although the client computing devices 12(1)-12(n) can interact with the API server computing device 14 for other purposes. By way of example, the plurality of client computing devices 12(1)-12(n) may run interface application(s) that may provide an interface to make requests to access, modify or monitor the plurality of storage devices 16(1)-16(n) via the communication network 30. In this example, each of plurality of client computing devices 12(1)-12(n) can be used by an operator, service consumer or service provider to access, modify or monitor the plurality of storage devices 16(1)-16(n) via the communication network 30, although the plurality of client computing devices 12(1)-12(n) can be used by other entities.

Each of the plurality of storage devices 16(1)-16(n) includes a central processing unit (CPU) or processor, a memory, an interface device, and an I/O system, which are coupled together by a bus or other link, although other numbers and types of network devices could be used. The API server computing device 14 communicates with each of the plurality of storage devices 16(1)-16(n) to manage the plurality of storage devices 16(1)-16(n) via communication networks 30, although the API server computing device 14 can communicate with the plurality of storage devices 16(1)-16(n) for other types of operations. By way of example only, the plurality of storage devices 16(1)-16(n) can be resource, service, physical resource like disks, controllers, or logical resource like storage volumes.

Although the exemplary network environment 10 includes the plurality of client computing devices 12(1)-12(n), the API server computing device 14 and the plurality of storage devices 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An exemplary method for managing API requests will now be described herein with reference to FIGS. 1-6. In step 305, the API server computing device 14 receives a request to list out all the volumes managed by the API server computing device 14 via a REST API interface from one of the plurality of client computing devices 12(1)-12(n), although the API server computing device 14 can receive other types of request using provider API or device specific API from the plurality of client computing devices 12(1)-12(n). In this example, the API server computing device 14 receives the REST API request to list out all the volumes from an operator using one of the plurality of client computing devices 12(1)-12(n). Additionally in this example, the API of the received request from the requesting one of the plurality of client computing devices 12(1)-12(n) is in a format different to the one supported by the API server computing device 14 or the plurality of storage devices 16(1)-16(n). Additionally, FIG. 4 is an exemplary illustration of the API server computing device 14 receiving and managing the REST API request received via a REST API interface.

Next in step 310, the API server computing device 14 scans the received request to identify a type of service requested, although the API server computing device 14 can identify other types of information in the received request. In this example, type of service indicates a type or description of the received request. By way of example only, the type of service associated with the received request to list the volumes is an inventory service type. Additionally, as previously illustrated, the API server computing device 14 is required to identify the service type as the API of the received request is not in a format that is supported either by the API server computing device or the plurality of storage devices 16(1)-16(n).

Next in step 315, the API server computing device 14 determines if there is one or more service instances associated with the identified service type stored within the memory 20, although the API server computing device 14 can determine for the one or more service instances at other memory locations. In this example, service instance relates to a specific realization of the instructions required to service the received request. For purpose of further illustration, the memory 20 includes list of instructions or software codes required to service the received requests. These instructions or software codes present within the memory 20 are either created by an administrator or obtained from other memory locations to service the previously received request. Additionally, FIG. 5 is an exemplary illustration of a service instance associated with the identified service type stored within the memory 20. Additionally, these stored instructions or software codes stored in the memory 20 are indexed in such way that they can be easily associated with a type of the requested service, by way of example only. Accordingly, when the API server computing device 14 determines that there is no service instance associated with the identified service type, then the No branch is taken to step 320.

In step 320, the API server computing device 14 proceeds to create a new service instance based on information from an administrator or a programmer and the exemplary flow proceeds to step 335 which will be further illustrated below. Alternatively, the API server computing device 14 can obtain the service instance from a secondary memory location for the identified service type instead of creating a new service instance.

However, if back in step 315, when the API server computing device 14 determines that there is at least one service instance associated with the identified service type, then the Yes branch is taken to step 325. In step 325, the API server computing device 14 identifies a filter based on the identified service type for the determined one or more service instances within the memory 20, although the API server computing device 14 can identify for the filter at other memory locations based on other parameters. In this example, filters relates to the information that provides the API server computing device 14 to identify one of the one or more service instances.

Next in step 330, the API server computing device 14 applies the identified filter to select one of the determined one or more service instances. By applying the filter to select one service instance, the technology disclosed is able to accurately select one of the multiple service instances including instructions or software code to service the received request.

In step 335, the API server computing device 14 scans the selected one of the service instance to identify service configuration. In this example, the service configuration provides additional information or parameters required to service the received request, although the service configuration information can include other types of amounts of information.

Next in step 340, the API server computing device 14 identifies an adaptor from the identified service configuration or parameters, although the API server computing device can identify other types or amounts of information. In this example, the adaptor within the service configuration information or parameters includes instructions to obtain the requested information from the plurality of storage devices 16(1)-16(n), although the adaptor can include other types or amounts of information. By way of example only, FIG. 6 is an exemplary illustration of an adapter identified from service configuration or parameters. By using the information in the identified adaptor, the technology disclosed herein is able to service the API request that is not supported by the API server computing device 14 or the plurality of storage devices 16(1)-16(n).

In step 345, the API server computing device 14 obtains the requested information from the plurality of storage devices 16(1)-16(n) using the information in the identified adaptor, although the API server computing device 14 can obtain the requested information from other memory locations based on other parameters. In this example, the API server computing device 14 obtains the list of all the storage volumes monitored by the API server computing device 14 from the plurality of storage devices 16(1)-16(n).

In step 350, the API server computing device 14 provides the requested information including the list of all storage volumes back to the requesting one of the plurality of client computing devices 12(1)-12(n), although the API server computing device 14 can provide other types of additional information back to the requesting one of the plurality of client computing devices 12(1)-12(n) responsive to the received request. By performing the above illustrated steps, the technology disclosed herein is able to service API requests that are not supported by the API server computing device 14 or the plurality of storage devices 16(1)-16(n). Additionally, the technology disclosed herein also avoids the requirement of converting the received API request from one form to another.

Accordingly, as illustrated and described with the examples herein this technology providing more effectively managing API requests. With this technology a centralized programmable platform is provided that avoids the requirement of converting API's from one format to another. Further, this technology supports integration of multiple tools and platforms without any restriction by processing the received API request in the format supported by the client devices. As a result, consumers or providers of the API's services have a consolidated management plane to monitor and control the different storage devices. Similar to API's for monitoring and managing storage devices, the technology disclosed herein is also able to support device specific API's.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing API (application programming interface) requests comprising:
    receiving, by an API server computing device, an API request to obtain a list of storage volumes from one or more storage devices, wherein the received API request is non-compatible with the API server computing device or the one or more storage devices;
    scanning, by the API server computing device, the received API request to identify a service type associated with the received request;
    identifying, by the API server computing device, one or more service instances associated with the identified service type;
    providing, by the API server computing device, the list of storage volumes from the one or more storage devices using information from at least one service instance of the identified one or more service instances without converting the received API request
    identifying, by the API server computing device, a filter for the identified one or more service instances based on the identified service type; and
    applying, by the API server computing device, the identified filter to the identified one or more service instances to select the at least one service instance from the identified one or more service instances.

2. The method as set forth in claim 1 further comprising scanning, by the API server computing device, the selected at least one service instance to identify service configuration information.

3. The method as set forth in claim 2 further comprising identifying, by the API server computing device, an adaptor from the identified service configuration information.

4. The method as set forth in claim 3 further comprising obtaining, by the API sever computing device, the list of storage volumes from the one or more storage devices using information present within the identified adaptor.

5. A non-transitory computer readable medium having stored thereon instructions for managing API (application programming interface) requests comprising executable code which when executed by a processor, causes the processor to perform steps comprising:
    receiving an API request to obtain a list of storage volumes from one or more storage devices, wherein the received API request is non-compatible with the API server computing device or the one or more storage devices;
    scanning the received API request to identify a service type associated with the received request;
    identifying one or more service instances associated with the identified service type; providing the list of storage volumes from the one or more storage devices using information from at least one service instance of the identified one or more service instances without converting the received API request;
    identifying a filter for the identified one or more service instances based on the identified service type; and
    applying the identified filter to the identified one or more service instances to select the at least one service instance from the identified one or more service instances.

6. The medium as set forth in claim 5 further comprising scanning the selected at least one service instance to identify service configuration information.

7. The medium as set forth in claim 6 further comprising identifying an adaptor from the identified service configuration information.

8. The medium as set forth in claim 7 further comprising obtaining the list of storage volumes from the one or more storage devices using information present within the identified adaptor.

9. An API (application programming interface) server computing device comprising:
    a memory containing machine readable medium comprising machine executable code having stored thereon instructions; and a processor coupled to the memory, configured to execute the machine executable code to:
    receive an API request to obtain a list of storage volumes from one or more storage devices, wherein the received API request is non-compatible with the API server computing device or the one or more storage devices;
    scan the received API request to identify a service type associated with the received request;
    identify one or more service instances associated with the identified service type;
    provide the list of storage volumes from the one or more storage devices using information from at least one service instance of the identified one or more service instances without converting the received API request;
    identify a filter for the identified one or more service instances based on the identified service type; and
    apply the identified filter to the identified one or more service instances to select the at least one service instance from the identified one or more service instances.

10. The device as set forth in claim 9 wherein the processor coupled to the memory is further configured to be capable of executing at least one additional programmed instruction comprising and stored in the memory to scan the selected at least one service instance to identify service configuration information.

11. The device as set forth in claim 10 wherein the processor coupled to the memory is further configured to be capable of executing at least one additional programmed instruction comprising and stored in the memory to identify an adaptor from the identified service configuration information.

12. The device as set forth in claim 11 wherein the processor coupled to the memory is further configured to be capable of executing at least one additional programmed instruction comprising and stored in the memory to obtain the list of storage volumes from the one or more storage devices using information present within the identified adaptor.

* * * * *